US011609078B2

(12) United States Patent
 Andersson

(10) Patent No.: US 11,609,078 B2
(45) Date of Patent: Mar. 21, 2023

(54) ADJUSTABLE SQUARE

(71) Applicant: Hultafors Group AB, Bollebygd (SE)

(72) Inventor: Göran Andersson, Borås (SE)

(73) Assignee: HULTAFORS GROUP AB, Bollebygd (SE)

( * ) Notice: Subject to any disclaimer, the term of this patent is extended or adjusted under 35 U.S.C. 154(b) by 205 days.

(21) Appl. No.: 17/015,646

(22) Filed: Sep. 9, 2020

(65) Prior Publication Data

US 2021/0072012 A1   Mar. 11, 2021

(30) Foreign Application Priority Data

Sep. 10, 2019   (EP) ................................ 19196420

(51) Int. Cl.
 *G01B 3/56* (2006.01)
 *G01B 1/00* (2006.01)
 *G01B 3/06* (2006.01)

(52) U.S. Cl.
 CPC .............. *G01B 3/566* (2013.01); *G01B 1/00* (2013.01); *G01B 3/06* (2013.01)

(58) Field of Classification Search
 CPC ................................... G01B 3/566; G01B 3/06
 See application file for complete search history.

(56) References Cited

U.S. PATENT DOCUMENTS

| 304,196 | A | | 8/1884 | Hill |
| 579,023 | A | | 3/1897 | Stoy |
| 1,226,172 | A | | 5/1917 | Benjamin |
| 1,295,841 | A | * | 3/1919 | Benjamin .............. G01B 3/566 403/97 |
| 1,663,821 | A | | 3/1928 | Tuomi |
| 2,775,037 | A | | 12/1956 | Baumunk |
| 2,837,826 | A | | 6/1958 | Cox |
| 2,942,634 | A | | 6/1960 | Gathercoal |

(Continued)

FOREIGN PATENT DOCUMENTS

| CH | 138040 A | 2/1930 |
| EP | 3832250 A1 * | 6/2021 ............... B25H 7/02 |

(Continued)

OTHER PUBLICATIONS

Office Action dated Dec. 23, 2021, issued in the corresponding Canadian Patent Application No. 3,092,537, 4 pages.

(Continued)

*Primary Examiner* — Christopher W Fulton
(74) *Attorney, Agent, or Firm* — Buchanan Ingersoll & Rooney P.C.

(57) ABSTRACT

A stepwise and stepless adjustable square for use in carpentry, including: a stock; a blade; a first alignment structure; a second alignment structure; a spring device; a spring expansion-restricting element; and a knob movable between a first position and a second position, wherein in the first position the first and second alignment structures at certain angles between the stock and the blade align and engage such that a force of the spring device is reduced compared to the force at angles where the first and second alignment structures do (Continued)

not align for stepwise adjustment, and wherein in the second position the first alignment structure is moved axially away from the second alignment structure for stepless adjustment.

14 Claims, 6 Drawing Sheets

(56) References Cited

U.S. PATENT DOCUMENTS

| | | | |
|---|---|---|---|
| 4,267,642 A | 5/1981 | Stapleford | |
| 4,446,627 A * | 5/1984 | Persson | B43L 7/12 |
| | | | 33/497 |
| 4,562,649 A | 1/1986 | Ciavarella | |
| 4,920,658 A * | 5/1990 | Hile | G01B 3/566 |
| | | | 33/499 |
| 5,839,201 A | 11/1998 | Young | |
| 6,543,144 B1 | 4/2003 | Morin | |
| 7,047,655 B2 * | 5/2006 | Larsson | G01B 3/566 |
| | | | 33/495 |
| 10,532,603 B2 * | 1/2020 | Hummel | B25H 7/02 |
| 2004/0172841 A1 | 9/2004 | Larsson | |
| 2011/0138643 A1 * | 6/2011 | Gao | G01B 3/56 |
| | | | 33/465 |
| 2019/0225009 A1 | 7/2019 | Hummel | |
| 2021/0072011 A1 | 3/2021 | Andersson | |

FOREIGN PATENT DOCUMENTS

| | | |
|---|---|---|
| GB | 532738 A | 1/1941 |
| GB | 2201251 A | 8/1988 |
| GB | 2396432 A | 6/2004 |
| WO | 0177609 A1 | 10/2001 |

OTHER PUBLICATIONS

Office Action dated Dec. 22, 2021, issued in the corresponding Canadian Patent Application No. 3,092,539, 5 pages.
Communication Pursuant to Article 94(3) EPC dated Sep. 29, 2021, issued in the European Patent Application No. 19196421.2, 3 pages.
Extended European Search Report dated Aug. 27, 2021, issued by the European Patent Office in corresponding European Application No. 21160979.7-1017, (5 pages).
Search Report dated Mar. 18, 2020, by the European Patent Office for Application No. 19196421.2.
European Search Report mailed in priority application No. EP 19196420.4, dated Mar. 9, 2020, 5 pages.

* cited by examiner

ADJUSTABLE SQUARE

TECHNICAL FIELD

The present invention relates to a stepwise and stepless adjustable square for use in carpentry.

BACKGROUND ART

A square is generally an instrument having at least one right angle and two straight edges used especially to lay out or test right angles. It may also be referred to a carpenter's square.

A non-adjustable or fixed square has a (longer) blade and a (shorter) stock which meet at a fixed angle of 90 degrees. The whole square could be made of steel, or the blade could be made stainless of steel while the stock is made of plastic, for example. The blade is typically marked with units of length, such as centimetres.

An adjustable square can be set to several positions. GB2396432 A discloses an adjustable square which comprises a blade and a handle, corresponding ends of which pivot about a common pivot axis. Connection means allows for the pivoting movement of the blade and handle about the pivot axis. The pivoting movement is limited by an indexing mechanism comprising of first and second matching profiled plates, the first plate has a series of radial ridges and the second plate has a corresponding series of radial grooves, the engagement of which results in the square being locked at a specific angle. The plates are biased into engagement with each other by a spring member which augments the locking action when a ridge of the first plate engages with a groove of the second plate. The spring is held in compression by the connection means.

Another type of square is the bevel square, wherein the blade pivots and can be locked at any angle relative to the stock, typically by loosening or tightening a screw.

SUMMARY OF THE INVENTION

It would be desirable to have an adjustable square which can be set to several positions, as for example in GB2396432 A, as well as to any angle, like a bevel square. It is therefore an object of the present invention to provide a technical solution to achieve such functionality.

According to an aspect of the invention, this and other objects are achieved by a stepwise and stepless adjustable square for use in carpentry, comprising: a stock; a blade rotatable relative to the stock around an axis of rotation; a first alignment structure adapted to rotate rigidly with the stock around the axis of rotation; a second alignment structure complimentary to the first alignment structure and adapted to rotate rigidly with the blade around the axis of rotation; a spring device which in conjunction with a spring expansion-restricting element of the adjustable square is adapted to axially press the second alignment structure towards the first alignment structure, wherein the spring expansion-restricting element is rigidly connected to the first alignment structure; and a knob operatively connected to the first alignment structure and movable between a first position and a second position, wherein in the first position the first alignment structure and the second alignment structure at certain angles between the stock and the blade align and engage such that a force of the spring device is reduced compared to the force at angles where the first and second alignment structures do not align for stepwise adjustment, and wherein in the second position the first alignment structure is moved axially away from the second alignment structure such that the first and second alignment structures are separated from each other and such that the spring device due to the likewise moved spring expansion-restricting element is compressed and urges a first surface associated with the blade into (stronger) frictional engagement with a second surface associated with the stock for stepless adjustment.

The stock could also be referred to as a tongue. That the knob is operatively connected to the first alignment structure may be construed as operation of the knob affects the first alignment structure, namely causes axial movement of the first alignment structure. When the knob is in the first position, the adjustable square can be set to several distinct positions (e.g. 22.5 degrees steps). When the knob is in the second position, the adjustable square can be set to any angle (stepless). The term "stronger" in the expression "into stronger frictional engagement" is relative to some weak(er) frictional engagement that can exist also when the knob is in the first position.

The present invention is based on the understanding that stepless setting of the blade angle conveniently can be added to a stepwise adjustable square by providing a knob which both separates the first and second alignment structures and at the same time urges surfaces associated with the blade and stock, respectively, into strong(er) frictional engagement, whereby inert stepless movement of the blade relative to the stock may be achieved as an alternative mode to the stepwise adjustment. To this end, the knob is operatively connected to the first alignment structure, which in turn is rigidly connected to the afore-mentioned spring expansion-restricting element. The present square which allows for both stepwise and stepless adjustment of the blade relative to the stock may be highly versatile. For example, the square can at one instance be used for building where fixed angles are used, such as setting up suds that are perpendicular to floor joists, and at another instance be used to transfer an arbitrary angle of e.g. a roof pitch to a workpiece.

The knob may be movable between the first position and second positions by rotation around the axis of rotation, wherein the knob comprises at least one circumferential wedge adapted to move the first alignment structure axially as the knob is rotated around the axis of rotation. The at least one circumferential wedge may be positioned radially outside the first and second alignment structures, whereby the height of the adjustment mechanism of the present square, which adjustment mechanism can include the alignment structures, spring device, knob, etc. can be kept low. This in turn makes the square easy to carry.

The first alignment structure may be prevented from rotating along with the knob by means of at least one set of matching elements of the first alignment structure and the stock, which matching elements allow at least some movement in a direction parallel to the axis of rotation.

The knob may comprise a lever pivotable in a plane parallel and proximal to a surface extending between first and second longitudinal edges of the stock. This allows the knob to be readily manipulated by a user, and it may also contribute to keeping the height of the adjustment mechanism low.

The spring expansion-restricting element may be rigidly connected to the first alignment structure by an intermediate column coaxial with the axis of rotation. In one or more embodiments, the second alignment structure and the spring device may be arranged about the intermediate column and between the first alignment structure and the spring expansion-restricting element.

The first and second alignment structures may each comprise radial ridges and valleys, both with inclined sides. At least partly due to the inclined sides, the user can adjust the square both stepwise and stepless by only manoeuvring the blade and stock, without necessarily having to somehow operate the knob at the same time.

The first surface associated with the blade may be a peripheral circumferential flat surface protruding from the second alignment structure, wherein the second surface associated with the stock is a circumferential flat surface of the stock surrounding an aperture of the stock, in which aperture the second alignment structure is at least partly received. The(se) first and second surfaces could always be in contact (i.e. even when the knob is in the first position), which may protect the first and second alignment structures as well as the at least one set of matching elements from dirt.

The friction torque of the frictional engagement when the knob is in the second position may be in the range of 0.3-30 Nm, preferably in the range of 0.5-15 Nm. This may give the stepless movement of the blade relative to the stock a suitable inertia. Furthermore, the square could have two second positions, one with looser stepless movement and one with more inert stepless movement.

The blade may be rotatable relative to the stock around the axis of rotation between a first extreme position at zero degrees, where the blade is parallel to the stock and partly provided in a space of the stock, and a second extreme position at about 270 degrees, where the blade is substantially perpendicular to the stock. That is, the blade may be rotatable (approximately) 270 degrees relative to the stock around the axis of rotation. Being able to move the blade up to (about) 270 degrees greatly enhances the usability of the adjustable square. To the inventor known adjustable squares can only move the blade up to less than 180 degrees.

The stock may have first and second longitudinal edges, wherein the space has a first slot that extends along the complete first longitudinal edge for receiving the blade in the first extreme position, wherein the space has a second slot that extends along only a portion of the second longitudinal edge for receiving the blade in the second extreme position, and wherein the remainder of the second longitudinal edge does not have a slot. This is useful in case one uses the adjustable square with the blade at 270 degrees and works with thin items such as sheet metal which can rest against the slot-less remainder of the second longitudinal edge. If the second slot would extend along the complete second longitudinal edge, the sheet metal could easily enter into such a slot. The first longitudinal edge preferably extends along the complete length of the stock. The second longitudinal edge preferably extends along the complete length of the stock. In other words, the first and second longitudinal edges may extend all along the stock.

The blade when positioned at 90 degrees can have an exposed short edge portion aligned with the second longitudinal edge of the stock and forming a right corner with the upper edge of the blade. This means that the adjustable square can have an "clean" perpendicular exterior contour similar to many non-adjustable or fixed squares, which may be useful for many types of measurements.

The heel of the adjustable square when the blade is in the second extreme position at about 270 degrees may be at least partly rounded. This allows the present square to properly bear against surfaces arranged at 90-180 deg angle without the (at least partly rounded) heel interfering, which in turn means that one readily can copy or transfer an obtuse angle. To achieve the at least partly rounded heel, both the blade and the stock could have an at least partly rounded corner.

The blade may be made of stainless steel and/or be marked with units of length. The blade may for example have millimetre graduations.

BRIEF DESCRIPTION OF THE DRAWINGS

This and other aspects of the present invention will now be described in more detail, with reference to the appended drawings showing one or more embodiments of the invention.

DETAILED DESCRIPTION

Figure 1A:
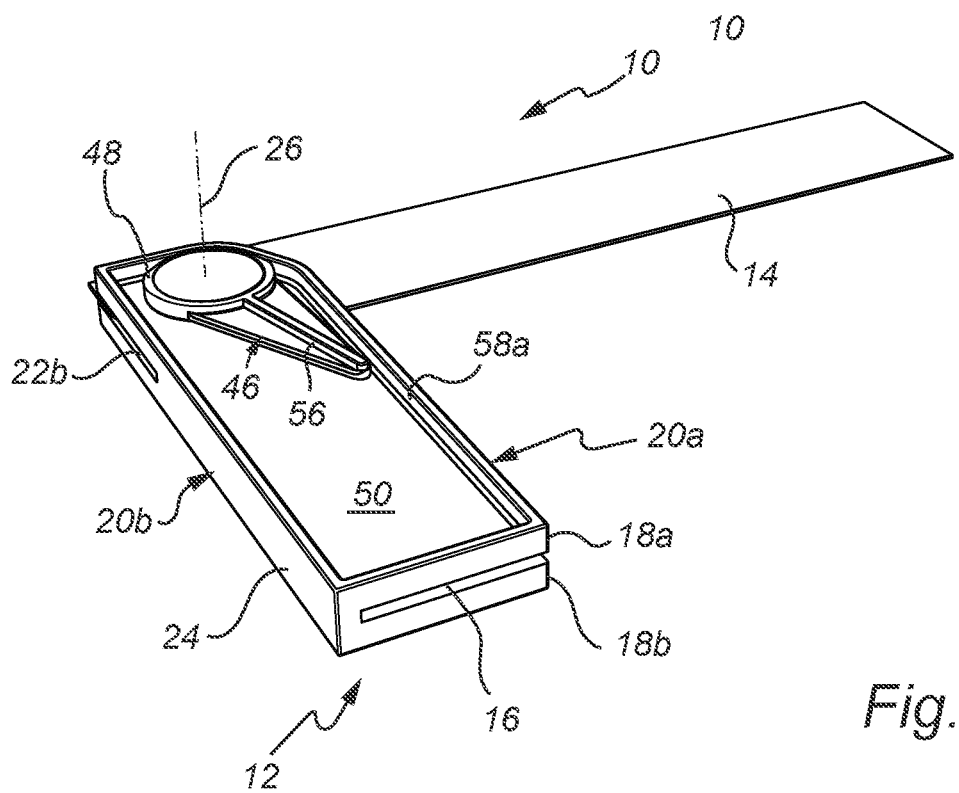
FIGS. 1a-b are perspective views of an adjustable square according to an embodiment of the present invention.
Figure 1B:
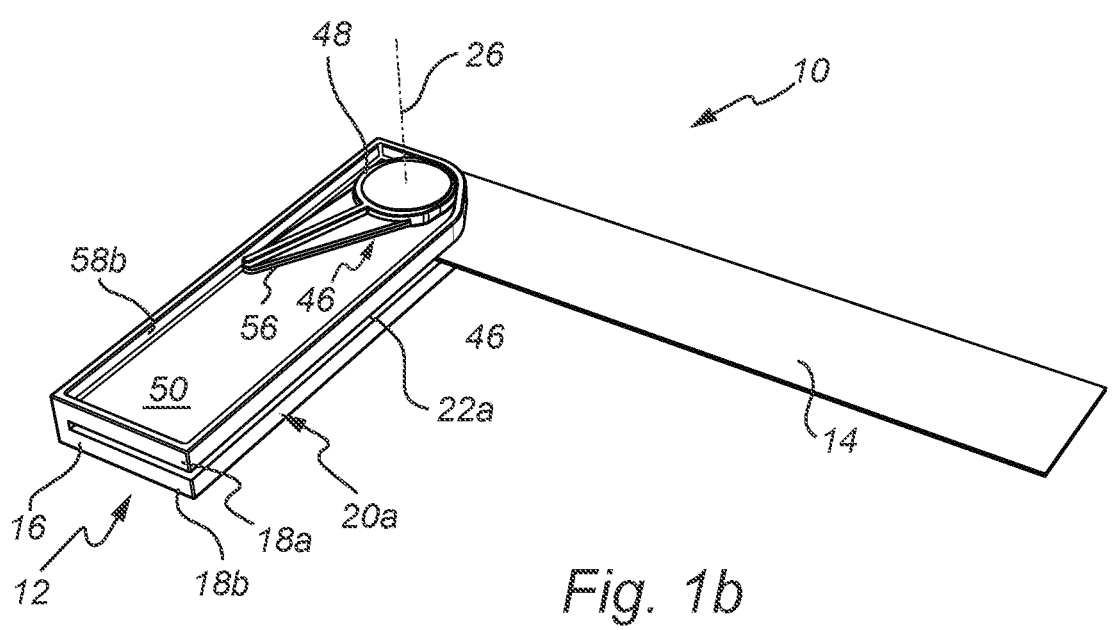

FIGS. 1a-b are perspective views of a stepwise and stepless adjustable square 10 (hereinafter referred to simply as "square") according to an embodiment of the present invention.

The square 10 comprises a stock 12 and a blade 14.

Figure 4A:
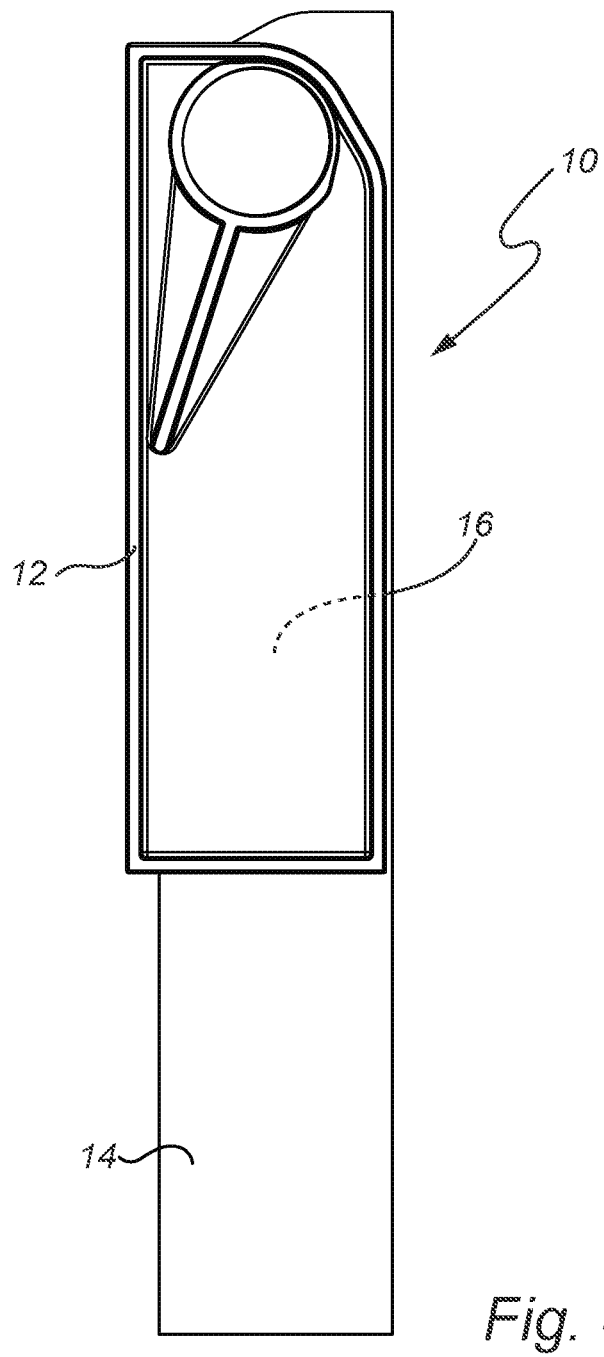
FIGS. 4a-d show the adjustable square according to one or more embodiments of the present invention with the blade at 0 degrees, 270 degrees, 90 degrees, and 225 degrees, respectively.

The stock 12 may comprise a(n internal) space 16 between first and second parallel stock portions 18a-b, in which space 16 the blade 14 may be partly provided (see for example FIG. 4a). The stock 12 may further have first and second longitudinal edges 20a-b, wherein a first slot 22a to the space 16 extends along the complete first longitudinal edge 20a, and wherein a second slot 22b to the space 16 extends along only a portion of the second longitudinal edge 20b while the remainder 24 of the second longitudinal edge 20b does not have any slot. The stock 12 could be made of (anodised) aluminium or magnesium or plastic, for example.

The 14 blade is rotatable relative to the stock 12 around an axis of rotation 26. The blade 14 has a generally rectangular shape and can be marked with units of length, such as millimetre graduations. The blade 14 can for example be made of stainless steel.

Figure 2A:
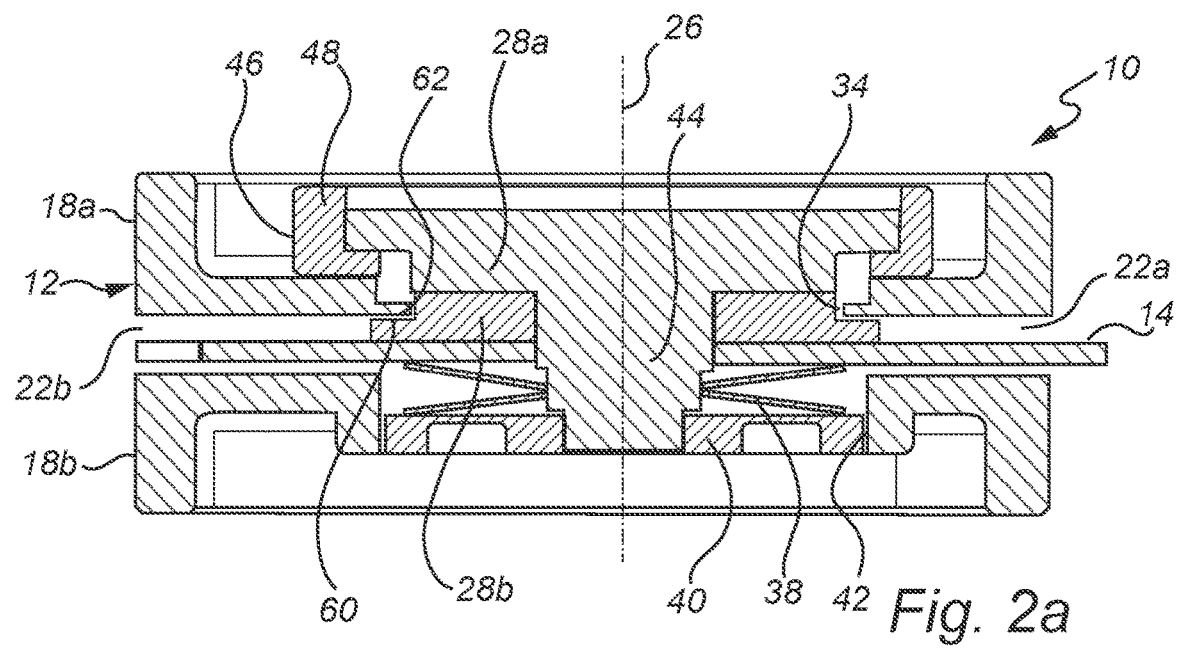
FIG. 2a-b are partial cross-sectional side views of the adjustable square as shown in FIGS. 1a-b.
Figure 2B:
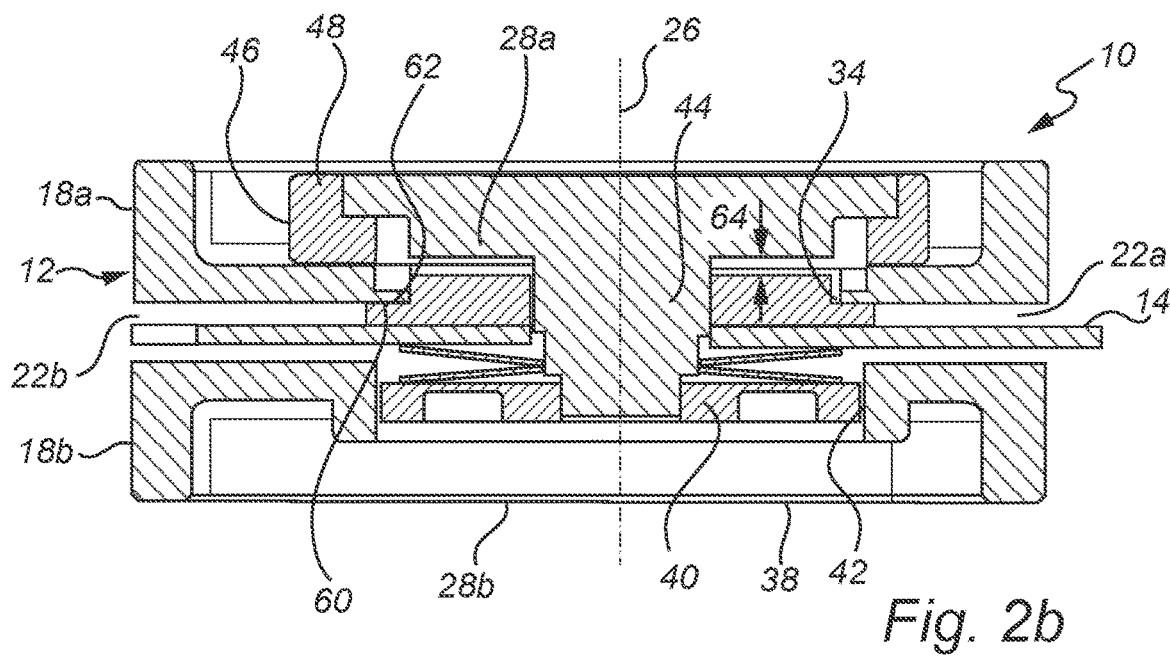
Figure 3:
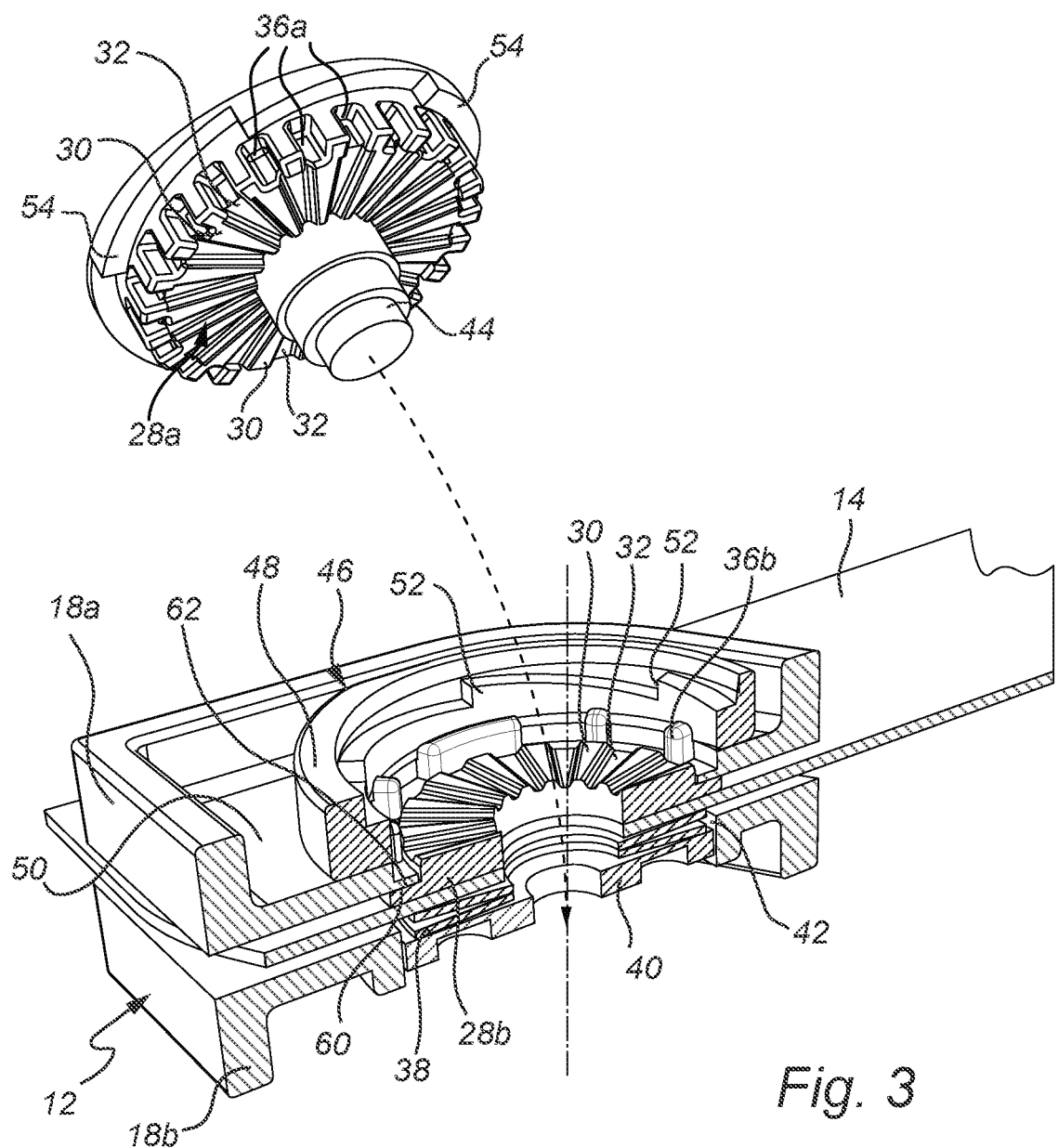
FIG. 3 is a partial cross-sectional perspective view of the adjustable square.

With further reference to FIGS. 2a-b and 3, the square 10 further comprises a first alignment structure 28a adapted to rotate rigidly with the stock 12 around the axis of rotation 26, and a second alignment structure 28b complimentary to the first alignment structure 28a and adapted to rotate rigidly with the blade 14 around the axis of rotation 26. The first and second alignment structures 28a-b may each comprise a (ring-shaped) surface with radial ridges 30 and valleys 32, similar to a crown gear. Typically, a radial ridge 30 of the first alignment structure 28a fits or matches a radial valley 32 of the second alignment structure 28b, and so on. The radial ridges 30 and valleys 32 should have inclined sides, as shown in FIG. 3.

The second alignment structure 28b may be firmly attached to, or integrated with, the blade 14, in order to rotate rigidly with the blade 14. Furthermore, the surface with radial ridges 30 and valleys 32 of the second alignment structure 28b is received in an aperture 34 of the first stock portion 18a of the stock 12.

The first alignment structure 28a may rotate rigidly with the stock 12 by means of at least one set of matching elements 36a-b of the first alignment structure 28a and the stock 12. Namely, the stock 12 may have splines 36b arranged along the perimeter of the aperture 34, which splines 36b match grooves 36a of the first alignment structure 28a, wherein the grooves 36a are arranged radially outside the surface with radial ridges 30 and valleys 32 of the first alignment structure 28a. The grooves 36a could be elastic, to avoid play in the rotational direction.

The square 10 further comprises a spring device 38, which in conjunction with a spring expansion-restricting element 40 is adapted to axially press the second alignment structure 28b towards the first alignment structure 28a. The spring expansion-restricting element 40 may for example be a (circular) plate arranged in an aperture 42 of the second stock portion 18b of the stock 12. The spring expansion-restricting element 40 is rigidly connected to the first alignment structure 28a, here by an intermediate column 44 coaxial with the axis of rotation 26. The first alignment structure 28a and the intermediate column 44 could be integral with each other, i.e. formed in one piece. The spring device 38 may be dual conical spring washers, for example. The spring device 38 may be arranged about the intermediate column 44 and between the spring expansion-restricting element 40 and the blade 14 (on the opposite side of the blade 14 compared to the second alignment structure 28b). The second alignment structure 28b, the blade 14, and the spring device 38 may each have a central opening in which the intermediate column 44 is received.

The square 10 further comprises a knob 46. The knob 46 is operatively connected to the first alignment structure 28a, and movable between a first position (FIGS. 1a and 2a) and a second position (FIGS. 1b and 2b) by rotation around the axis of rotation 26. Specifically, the knob 46 comprises a ring 48 arranged around the aperture 34 of the first stock portion 18a, radially outside of the splines 36b. The ring 48 further abuts an outer surface 50 of the first stock portion 18a, which outer surface 50 extends between the first and second longitudinal edges 20a-b of the stock 12. The ring 48 of the knob 46 comprises circumferential wedges 52. Namely, each circumferential wedge 52 extends along a portion of the inner circumference of the ring 48. The circumferential wedges 52 are adapted to move the first alignment structure 28a axially as the knob 46 is rotated around the axis of rotation 26. To this end, the first alignment structure 28a has corresponding wedges 54 arranged radially outside the afore-mentioned grooves 36a. In FIG. 3, the height of each circumferential wedge 52 increases in the counter-clockwise direction. Hence, by turning the knob 46 in the clockwise direction (from the first position to the second position), the first alignment structure 28a can be moved axially away from the second alignment structure 28b, and by turning the knob 40 in the counter-clockwise direction (from the second position to the first position), the first alignment structure 28a can be moved axially towards the second alignment structure 28b. The afore-mentioned at least one set of matching elements, i.e. the grooves 36a and splines 36b, prevent the first alignment structure 28a from rotating along with the knob 46, but allow the axial movement of the first alignment structure 28a, i.e. movement in a direction parallel to the axis of rotation 26.

The knob 46 further comprises a lever 56 extending from the ring 48. The lever 56 is pivotable in a plane parallel and proximal to the surface 50. The lever 56 is intended to be operated by a user of the square 10, conveniently by the thumb while holding the stock 12 with the same hand. The rotation of the knob 46 may be limited by the lever 56 abutting first and second insides 58a-b of the first and second longitudinal edges 20a-b. The knob 46 may be in the afore-mentioned first position when the lever 56 abuts the first inside 58a (FIG. 1a), and the knob 46 may be in the second position when the lever 56 abuts the second inside 58b (FIG. 1b). Apart from the second inside 58b, due to friction, no further means may be needed to allow the knob 46 to stay in the second position without a user having to hold the knob 46 in the second position (to prevent it from going back to the first position by itself).

The square 10 further comprises a first (friction) surface 60 associated with the blade 14 and a second (friction) surface 62 associated with the stock 12. Specifically, the first surface 60 is a peripheral circumferential (ring-shaped) flat surface protruding from the second alignment structure 28b, wherein the first surface 60 is radially outside the surface with radial ridges 30 and valleys 32 of the second alignment structure 28b. The second surface 62 is a circumferential (ring-shaped) flat surface of the first stock portion 18a of the stock 12, which surface 62 surrounds the aperture 34. In other words, the second surface 62 extends along the perimeter of the aperture 34, on the opposite side of the aperture 34 compared to the splines 36b.

In the first position of the knob 46, corresponding to stepwise adjustment of the square 10, the first alignment structure 28a and the second alignment structure 28b at certain angles between the stock 12 and the blade 14 align and engage such that a force of the spring device 38 is reduced compared to the force at angles where the first and second alignment structures 28a-b do not align. Namely, when the ridges 30 of the first alignment structure 28a are received in the valleys 32 of the second alignment structure 28b and vice versa, the force of the spring device 38 is lower than when the ridges 30 of the first alignment structure 28a and the ridges 30 of the second alignment structure 28b are abutting each other. Hence in the first position of the knob 46, the square 10 can be set to several distinct positions (e.g. 22.5 degrees steps) corresponding to said certain angles. It is appreciated that when the user here rotates the blade 14 relative to the stock 12, the user will feel when the blade 14 "snaps" into one of those distinct position. By exerting some greater rotational force (to get the ridges 30 out of the valleys 32), the user can easily move the blade 14 to the next distinct position.

However, in the second position of the knob 46, corresponding to stepless adjustment of the square 10, the first alignment structure 28a is moved axially away from the second alignment structure 28b such that the first and second alignment structures 28a-b are separated from each other and such that the spring device 38 due to the likewise axially moved spring expansion-restricting element 40 is compressed and urges the afore-mentioned first (friction) surface 60 into (stronger) frictional engagement with the second (friction) surface 62, see FIG. 2b showing gap 64 between the first and second alignment structures 28a-b. Hence in the second position of the knob 46, the square 10 can be set to set to any angle. It is appreciated that when the user here rotates the blade 14 relative to the stock 12, the user will not "feel" the afore-mentioned distinct position. The friction torque of the frictional engagement when the knob 46 is in the second position may be in the range of 0.3-30 Nm, to give the stepless movement of the blade 14 relative to the stock 12 a suitable inertia. That is, the rotational force needed to be applied by the user to move the blade 14 must be greater than 0.3-30 Nm, to overcome the torque caused by the frictional force that occurs when the first and second surfaces 60 and 62 in contact move.

The present square 10 which allows for both stepwise and stepless adjustment of the blade 14 relative to the stock 12 may be highly versatile. For example, the square 10 can at one instance be used for building where fixed angles are used, such as setting up studs that are perpendicular to floor joists, and at another instance be used to transfer an arbitrary angle of e.g. a roof pitch to a workpiece.

Figure 4B:
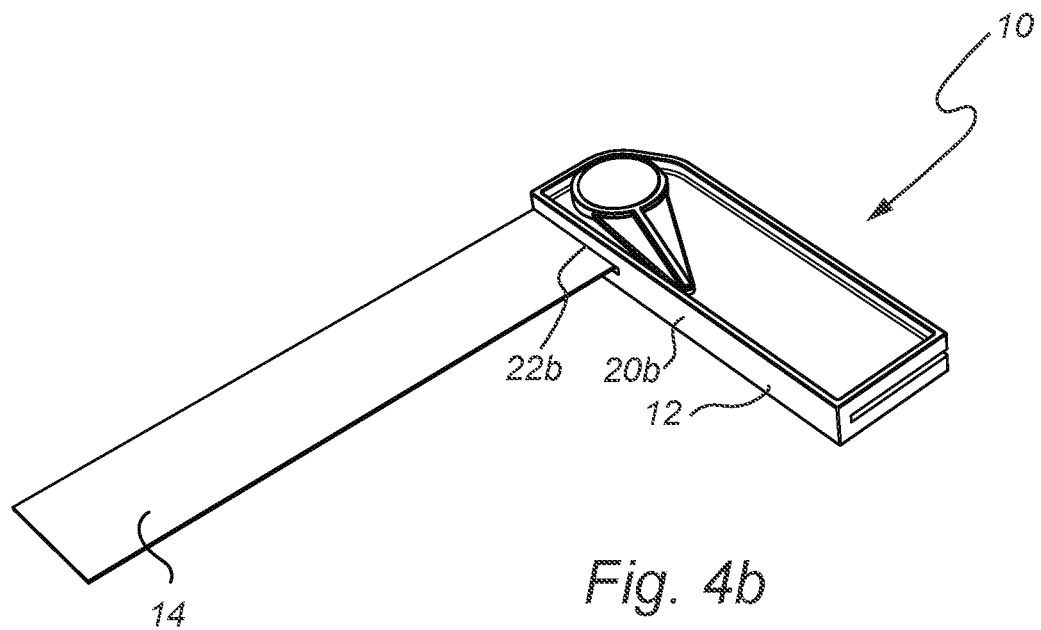

Turning to FIGS. 4a-b, the blade 14 of the square 10 is preferably rotatable relative to the stock 12 around the axis of rotation 26 between a first extreme position at zero degrees where the blade 14 is parallel to the stock 12 and partly provided in the aforementioned space 16 of the stock 12 (FIG. 4a), and a second extreme position at about 270 degrees where the blade 14 is substantially perpendicular to the stock 12 (FIG. 4b). In the second extreme position, the blade 14 is received in the second slot 22b of the second longitudinal edge 20b of the stock 12. With 22.5 degrees steps, this results in twelve distinct positions. With 45 degrees steps, the square 10 could have six distinct blade positions (apart from the position at zero degrees when the blade 14 is in the stock 12).

Figure 4C:
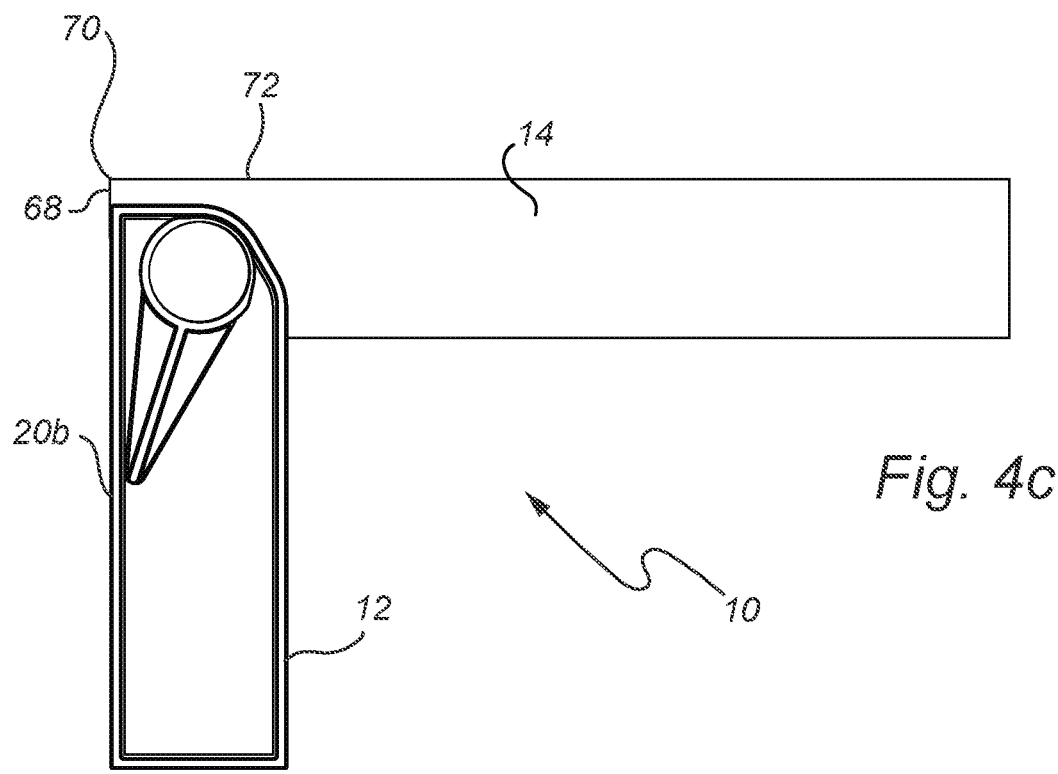

As seen when positioned at 90 degrees (FIG. 4c), the blade 14 can have an exposed short edge portion 68 aligned with the second longitudinal edge 20b of the stock 14 and forming a right corner 70 with the upper edge 72 of the blade 12. This means that the square 10 can have an "clean" or continuous perpendicular exterior contour, as seen in FIG. 4c.

Figure 4D:
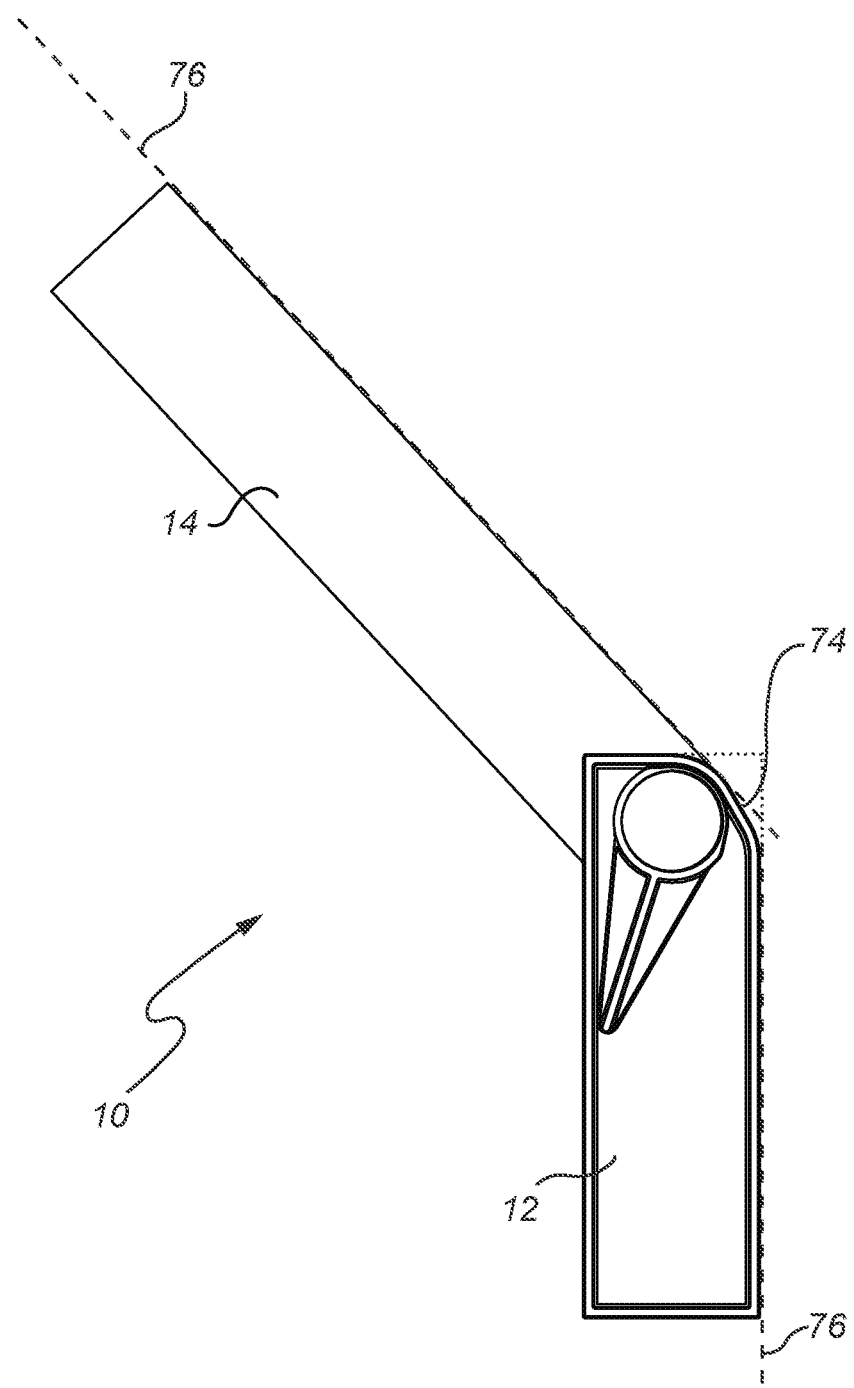

Finally in FIG. 4d, the so-called heel 74 of the square 10 (as seen when the blade 14 is in the second extreme position at about 270 degrees) is at least partly rounded. This allows the square 10 to properly bear against surfaces 76 arranged at 90-180 deg angle without the heel 74 interfering. This is readily appreciated when considering the dotted non-rounded heel also shown in FIG. 4d just for comparison purposes. To achieve the at least partly rounded heel 74, both the blade 14 and the stock 12 may have an at least partly rounded corner.

The person skilled in the art realizes that the present invention by no means is limited to the preferred embodiments described above. On the contrary, many modifications and variations are possible within the scope of the appended claims.

The invention claimed is:

1. A stepwise and stepless adjustable square for use in carpentry, comprising:
   a stock;
   a blade rotatable relative to the stock around an axis of rotation;
   a first alignment structure adapted to rotate rigidly with the stock around the axis of rotation;
   a second alignment structure complementary to the first alignment structure and adapted to rotate rigidly with the blade around the axis of rotation;
   a spring device which in conjunction with a spring expansion-restricting element of the adjustable square is adapted to axially press the second alignment structure towards the first alignment structure, wherein the spring expansion-restricting element is rigidly connected to the first alignment structure; and
   a knob operatively connected to the first alignment structure and movable between a first position and a second position,
   wherein in the first position the first alignment structure and the second alignment structure at certain angles between the stock and the blade align and engage such that a force of the spring device is reduced compared to the force at angles where the first and second alignment structures do not align for stepwise adjustment, and wherein in the second position the first alignment structure is moved axially away from the second alignment structure such that the first and second alignment structures are separated from each other and such that the spring device due to the likewise moved spring expansion-restricting element is compressed and urges a first surface associated with the blade into frictional engagement or into stronger frictional engagement with a second surface associated with the stock for stepless adjustment.

2. A square according to claim 1, wherein the knob is movable between the first position and second positions by rotation around the axis of rotation, and wherein the knob comprises at least one circumferential wedge adapted to move the first alignment structure axially as the knob is rotated around the axis of rotation.

3. A square according to claim 2, wherein the at least one circumferential wedge is positioned radially outside the first and second alignment structures.

4. A square according to claim 2, wherein the first alignment structure is prevented from rotating along with the knob by means of at least one set of matching elements of the first alignment structure and the stock, which matching elements allow at least some movement in a direction parallel to the axis of rotation.

5. A square according to claim 2, wherein the knob comprises a lever pivotable in a plane parallel and proximal to a surface extending between first and second longitudinal edges of the stock.

6. A square according to claim 1, wherein the spring expansion-restricting element is rigidly connected to the first alignment structure by an intermediate column coaxial with the axis of rotation.

7. A square according to claim 1, wherein the first and second alignment structures each comprises radial ridges and valleys, both with inclined sides.

8. A square according to claim 1, wherein the first surface associated with the blade is a peripheral circumferential flat surface protruding from the second alignment structure, and wherein the second surface associated with the stock is a circumferential flat surface of the stock surrounding an aperture of the stock, in which aperture the second alignment structure is at least partly received.

9. A square according to claim 1, wherein the friction torque of the frictional engagement when the knob is in the second position is in the range of 0.3-30 Nm.

10. A square according to claim 1, wherein the blade is rotatable relative to the stock around the axis of rotation between a first extreme position at zero degrees, where the blade is parallel to the stock and partly provided in a space (16) of the stock, and a second extreme position at about 270 degrees, where the blade is substantially perpendicular to the stock.

11. A square according to claim 10, wherein stock has first and second longitudinal edges, wherein the space has a first slot that extends along the complete first longitudinal edge for receiving the blade in the first extreme position, wherein the space has a second slot that extends along only a portion of the second longitudinal edge for receiving the blade in the second extreme position, and wherein the remainder of the second longitudinal edge does not have a slot.

12. A square according to claim 10, wherein the blade when positioned at 90 degrees has an exposed short edge portion aligned with a second longitudinal edge of the stock and forming a right corner with the upper edge of the blade.

13. A square according to claim 10, wherein the heel of the adjustable square when the blade is in the second extreme position at about 270 degrees is at least partly rounded.

14. A square according to claim 1, wherein the blade is made of stainless steel and/or is marked with units of length.

\* \* \* \* \*